United States Patent Office 3,163,702
Patented Dec. 29, 1964

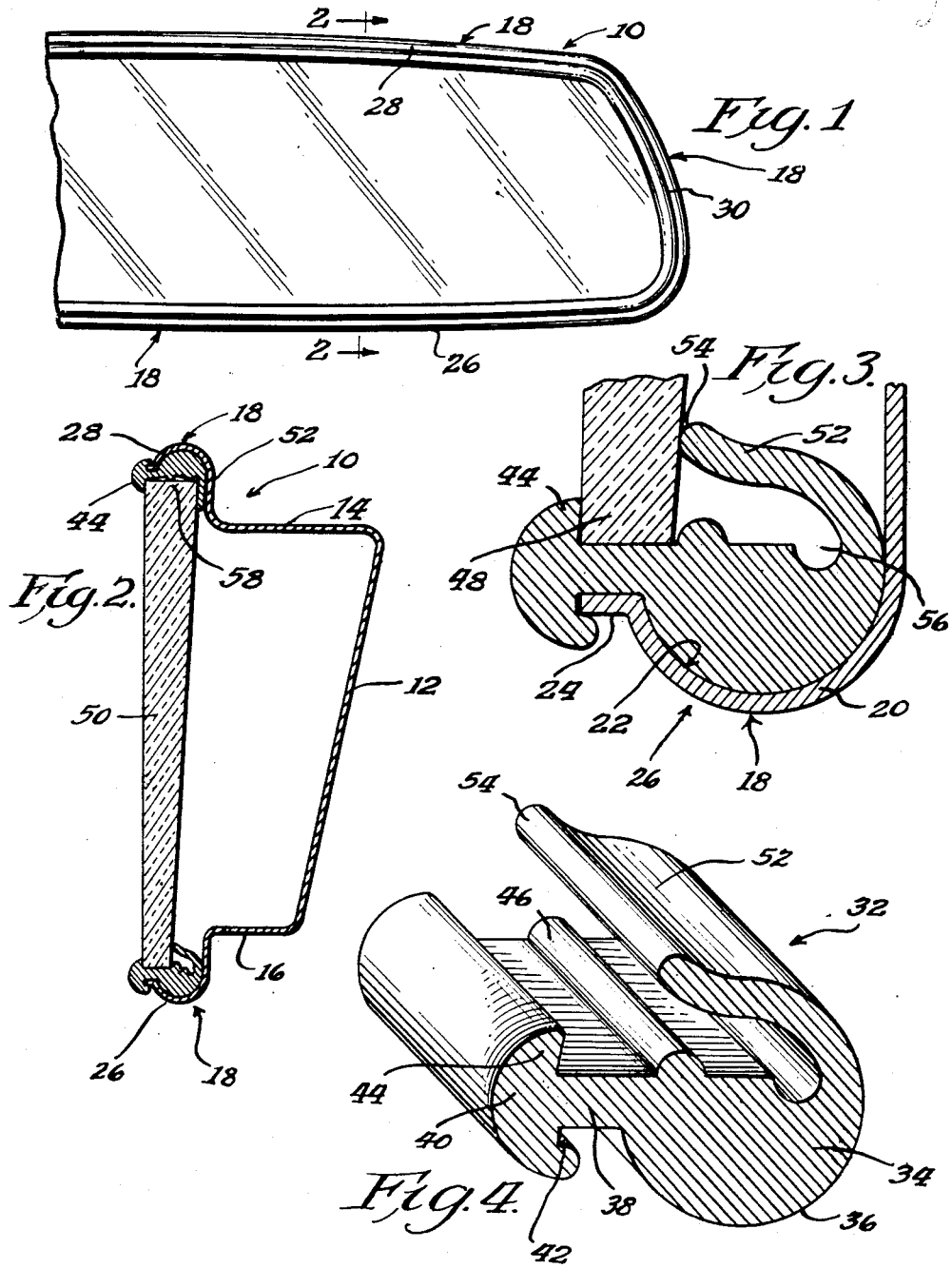

3,163,702
PRISMOIDAL MIRROR ASSEMBLY
John G. Warhol, Oak Park, Mich., assignor to Nelmor Corporation, Harper Woods, Mich., a corporation of Illinois
Filed May 1, 1961, Ser. No. 106,740
2 Claims. (Cl. 88—96)

This invention relates to improvements in mirrors, and more particularly to the means for retaining the mirror in the housing.

One of the objects of this invention is to provide means for retaining the mirror in the casing and enclosing the rough or sharp mirror edges from exposure to avoid personal contact with same and injury to a person.

Another object of this invention is to provide means whereby a mirror may be readily assembled and secured in a rear view mirror casing in a minimum of time and with minimum labor and material costs, which thereby reduces the manufacturing costs of such rear view mirrors.

Another object of this invention is to provide a retainer seal for a prismoidal mirror or a mirror having different edge thicknesses, which seal is of preformed shape and will accommodate itself to the different edge thicknesses of the mirror to effectively seal the mirror within the housing. The retainer seal is of a uniform shape, configuration, and construction.

Another object of this invention is to provide a retainer seal which is formed or molded of vinyl, nylon, rubber, or plastic extrusion of a preformed shape in a continuous length and which is thereafter cut to form a continuous sealing strip in the casing or housing of a rear view mirror to accommodate a prismoidal mirror or any mirror having different edge thicknesses and which will be sufficiently resilient to accommodate the different edge thicknesses of the mirror and effectively seal same within the casing.

The prismoidal mirrors now on the market have an upper edge thicker than the lower edge. The means for securing such mirrors are very unsatisfactory. In addition, there are added labor costs in the initial installation and assembling of same in the housing. With the present invention, the bezel of the casing or mirror housing is of uniform construction along its top, bottom and sides and the sealing or retaining strip is of a uniform shape and construction and is adapted to be retained within the bezel to support the prismoidal mirror without any other retaining means. The retaining strip is of such construction and resilience that it will accommodate itself to the difference in the thickness of the lower and upper edges, as well as the side edges of the prismoidal mirror. Thus, it is only necessary to insert the retainer strip in the bezel and insert the prismoidal mirror so that the edges of the mirror are positioned within the retainer strip and the mirror will be effectively sealed and retained in the housing without the use of any other extraneous securing means. This reduces the cost of the materials as well as of the assembly and appreciably reduces the cost of such a rear view mirror.

Other objects will become apparent as this description progresses.

In the drawings:

FIGURE 1 is a front elevational view of a portion of a mirror utilizing this invention.

FIGURE 2 is an enlarged cross-sectional view taken on lines 2—2 of FIGURE 1.

FIGURE 3 is an enlarged cross-sectional view of the lower portion of FIGURE 2, and FIGURE 4 is a perspective sectional view of a portion of the sealing strip or retaining seal utilized in this invention.

The rear view mirror casing or housing, which is of generally rectangular shape is indicated at 10, and includes a rear wall 12, forwardly extending upper and lower horizontal walls 14 and 16, with corresponding side walls, not shown. Extending forwardly of said walls is a continuous bezel, generally indicated at 18, for receiving the retainer seal or sealing strip, to be described.

The bezel 18, as shown, extends continuously along the front of the top, bottom and sides of the casing and is of an arcuate shape 20 in cross-section to form a continuous channel, generally indicated at 22, with a forwardly extending lip 24. The bottom channel or bezel is indicated at 26, the top bezel at 28, and the opposite side bezels at 30, the sides being merely continuations of the top and bottom channels. While the bezels are shown in arcuate or channel shape, it will be understood that any other configuration may be utilized within the purview of this invention, provided however, that the shape of the sealing strip adapted to fit therewithin conforms to the modified shape of the channel.

The retainer seal or sealing strip which is adapted to be seated within the bezel or channel comprises a strip which is generally indicated at 32 and which is formed or molded of vinyl, nylon, rubber, or may be of a plastic extrusion. The strip has the preformed cross-sectional shape shown in FIGURE 4. The strip 32 when molded or formed is of indefinite length and may be cut to a length to fit continuously within the top, bottom and sides of the bezel or channel of the housing. If desired, the strip may be molded of the required length, however, if same is extruded then it would be formed of an indefinite length and subsequently cut.

The strip 32 is of uniform shape and design throughout its length and comprises a body portion 34, the exterior surface of which is arcuate shaped as at 36 to seat within the channel 20 of the mirror housing. However, if the bezel is formed of a shape other than arcuate, as previously described, then the outer or exterior surface of the body of the strip should conform to said modified shape to fit within the modified bezel.

With respect to the sealing strip illustrated, a neck portion 38 extends forwardly of the body 32, and an enlargement or head, generally indicated at 40, extends forwardly of the neck. The enlargement or head extends outwardly above and below the neck portion. As best seen in FIGURE 3, the neck portion 38 extends over the lip 24 of the bezel and the head has an undercut 42 which extends over the forward edge of the lip 24 and then extends below and rearwardly of the lip to completely enclose and cover the outer edge of the lip. The other portion of the head forms an inclined keeper edge or retaining lip 44.

The inner surfaces of the body and neck portions are co-planar and flat and there is a longitudinally extending bead 46. As best seen in the enlargement, FIGURE 3, the distance between the inner vertical wall of the keeper edge 44 and the front wall of the bead is equal to approximately the thickness of the lower edge 48 of the mirror 50 so that the lower edge of the mirror fits therebetween.

Extending rearwardly of the body of the strip is an upwardly and inwardly extending flange 52 which is spaced from the body 34. The outer edge 54 of said flange when molded is substantially in vertical alinement with the forward portion of the bead. As viewed in FIGURE 4, the flange 52 resembles a curled up tail portion. The body 34 adjacent the flange 52 is recessed as at 56. The strip is extruded or preshaped to conform to the shape shown in FIGURE 4, and with the lower edge 48 of the mirror secured in the strip, the position of same will be as shown in FIGURE 3, the inclined keeper edge 44 being compressed forwardly, with the edge 54 of the flange 52 abutting against the rear of the lower part of the mirror 50.

As seen in FIGURE 2, the upper edge 58 of the prismoidal mirror is of a greater thickness than the lower edge, and when the upper edge of the mirror is seated within the strip 32, the upper edge 58 spans the distance between the keeper edge 44 and the flange 52, and extends across the bead of the seal, as shown. Since the retaining strip is formed of a resilient material, the flange 52 will accommodate itself to the different thicknesses of the edges of the mirror 50, and instead of curving inwardly as shown in the lower portion, the flange 52 will assume a generally perpendicular shape with respect to the body 34 and bear flat against the rear wall of the mirror adjacent to the upper edge.

It should be understood that the strip 32 is a continuous strip positioned within the bezel and that the portion of the strip shown at the upper end is the same and a continuation of the strip shown below, except that the strip has assumed the shape shown in the upper portion to accommodate the difference in the thickness of the mirror.

With respect to the shape of the strip along the opposite sides of the mirror, such as at 18, it will be seen that the strip portion along the side adjacent the lower end will conform more nearly like that shown at the bottom in FIGURE 2, while the strip portion in the upper end of the side will conform to the upper portion of FIGURE 2.

With this construction the mirror will not pop out or loosen of its own accord. The edges of the mirror glass do not have to be ground to eliminate sharp edges since same are confined and enclosed within the sealing strip, therefore, mirror glass may be used which has not been finished to the extent now necessary in conventional practice. The strip likewise covers any sharp edges of the housing or irregularities of the lip of the housing.

The seal or strip of this invention provides two pressure points for supporting the mirror. They are at the bead 46 and at the flange end 54 which abuts against the rear of the mirror. With respect to the bead, the location of the bead 46 is determined by the thinnest edge of the mirror, which in the embodiment shown is the lower edge so that the lower edge of the mirror is seated between the lip or keeper edge 44 and the bead 46. The bead helps prevent the mirror from traveling deeper inwardly in the housing. The bead also permits variations in the material that is used in the forming of the strip because materials vary in their compression rate and are influenced by heat and cold expansion. The contraction of the size of the bead will be determined by the material used so that it will firmly help hold up the thin edge of the mirror and act as a build-up for compression and physical changes of the material against the heavy or thicker edge of the mirror. The other pressure point is along the edge 54 of the flange 52 and is so designed that it will give way to irregular mirror wall thicknesses. The tensile strength of the flange 52 also can vary in thickness due to the materials used.

By virtue of the retainer seal construction, the mirror will not chip or crack from a sharp metallic blow against the edge of the housing as is true with the standard methods now in use in retaining mirrors, such as where the mirrors are held by crimping means, glues, or staked-in methods. Likewise, the temperature changes will have no ill effects on the present construction whereas they would seriously affect those constructions in which the mirrors are held as previously described.

It will be understood that various changes and modifications may be made from the foregoing without departing from the spirit and scope of the appended claims.

What is claimed is:

1. A prismoidal mirror assembly including a housing having a continuous bezel which includes a channel provided with a vertically extending rear flange wall, a rear housing wall connected to said rear flange wall, said channel having a forwardly extending lip, a retaining strip supported in said channel and a prismoidal mirror supported in said retaining strip, said prismoidal mirror having a thicker and a thinner generally horizontal edge, said retaining strip comprising a preformed and preshaped member having a body portion nesting within said channel, a neck portion extending forwardly of the body and positioned within the forwardly extending lip of the bezel and receiving the edge of the mirror, means on the retainer between said neck and said body for engaging the edge of the mirror, said means engaging the rear of the mirror on said thinner edge and engaging the periphery of the mirror on said thicker edge, an enlarged head extending forwardly of the neck portion, said head having portions extending in opposite directions, one portion of said enlarged head extending outwardly substantially at right angles to said neck and covering the edge of the lip of the bezel and the other enlarged oppositely extending portion extending inwardly and forming a lip against which the front of the mirror rests, said strip having a distortable flange extending rearwardly of the body portion and resting against the rear of the mirror, said flange being formed of a distortable material and having a thickness less than said body portion so that it may accommodate itself to the difference in the thickness of the mirror so that where the retainer strip engages the thicker edge of the mirror the distortable flange will be positioned substantially parallel with the rear edge of the mirror and will engage the rear flange wall of the casing, and where the retainer strip engages the thinner edge of the mirror the rear edge of the mirror will engage the means between said neck and said body and only the extremity of the flange will engage the rear of the mirror.

2. A structure defined in claim 1 in which the means on the retaining strip between the neck and the body for engaging the mirror is a bead.

References Cited in the file of this patent

UNITED STATES PATENTS

| 2,189,138 | Eichner | Feb. 6, 1940 |
|---|---|---|
| 2,214,222 | Chaffee | Sept. 10, 1940 |
| 2,579,148 | Jones | Dec. 18, 1951 |
| 2,654,919 | Marvin | Oct. 13, 1953 |
| 2,772,915 | Renno | Dec. 4, 1956 |
| 2,812,558 | Labanoff | Nov. 12, 1957 |
| 2,900,872 | Mazur et al. | Aug. 25, 1959 |

FOREIGN PATENTS

| 537,294 | Canada | Feb. 19, 1957 |
|---|---|---|
| 1,116,885 | Germany | Nov. 9, 1961 |
| 766,597 | Great Britain | Jan. 23, 1957 |
| 551,636 | Italy | Nov. 22, 1956 |